US010029375B2

(12) United States Patent
Beevers

(10) Patent No.: US 10,029,375 B2
(45) Date of Patent: Jul. 24, 2018

(54) TENDON SYSTEMS FOR ROBOTS

(71) Applicant: Timothy R. Beevers, McMinnville, OR (US)

(72) Inventor: Timothy R. Beevers, McMinnville, OR (US)

(*) Notice: Subject to any disclaimer, the term of this patent is extended or adjusted under 35 U.S.C. 154(b) by 0 days.

(21) Appl. No.: 15/843,413

(22) Filed: Dec. 15, 2017

(65) Prior Publication Data

US 2018/0099417 A1 Apr. 12, 2018

Related U.S. Application Data

(63) Continuation of application No. 14/734,390, filed on Jun. 9, 2015, now Pat. No. 9,844,886.

(51) Int. Cl.
| | |
|---|---|
| *B25J 15/00* | (2006.01) |
| *B25J 15/12* | (2006.01) |
| *B25J 9/10* | (2006.01) |
| *B25J 19/00* | (2006.01) |
| *B25J 15/10* | (2006.01) |

(52) U.S. Cl.
CPC ............ *B25J 15/12* (2013.01); *B25J 9/104* (2013.01); *B25J 15/0009* (2013.01); *B25J 15/10* (2013.01); *B25J 19/0062* (2013.01); *Y10S 901/21* (2013.01); *Y10S 901/36* (2013.01)

(58) Field of Classification Search
CPC ........ B25J 15/12; B25J 9/104; B25J 15/0009; B25J 15/10; B25J 19/0062; B25J 15/0233; Y10S 901/21; Y10S 901/36; A61F 2/586; B23P 15/00
USPC ................... 294/111, 200; 623/64
See application file for complete search history.

(56) References Cited

U.S. PATENT DOCUMENTS

| | | | | |
|---|---|---|---|---|
| 2,545,452 A | * | 3/1951 | Fletcher ................. | A61F 2/586 623/64 |
| 4,946,380 A | * | 8/1990 | Lee ......................... | A61F 2/583 294/111 |
| 6,817,641 B1 | * | 11/2004 | Singleton, Jr. ........... | B25J 9/102 294/106 |
| 8,052,185 B2 | * | 11/2011 | Madhani .............. | B25J 15/0009 294/106 |
| 8,245,594 B2 | * | 8/2012 | Rogers ................... | A61B 17/29 294/111 |
| 8,276,958 B2 | | 10/2012 | Ihrke et al. | |
| 8,412,376 B2 | | 4/2013 | Abdallah et al. | |
| 8,467,903 B2 | | 6/2013 | Ihrke et al. | |

(Continued)

FOREIGN PATENT DOCUMENTS

CN 203283310 U 11/2013

*Primary Examiner* — Gabriela M Puig
(74) *Attorney, Agent, or Firm* — Timothy E. Siegel Patent Law, PLLC; Timothy E. Siegel

(57) ABSTRACT

A method of assembling a portion of a robot, including, providing a robot arm having an exterior surface and providing a tendon retaining element, having a first half having a first major surface, defining open channels and a second half having a second major surface. Then, placing a tendon in each of the open channels of the first half and placing the second major surface on the first major surface, thereby creating a set of closed channels each having a tendon passing therethrough and creating a finished tendon retaining element. Finally, attaching the finished tendon retaining element about the exterior surface of the robot arm, so that the tendons extend along the length of the robot arm.

8 Claims, 6 Drawing Sheets

(56) References Cited

U.S. PATENT DOCUMENTS

| | | | |
|---|---|---|---|
| 8,516,918 B2 | 8/2013 | Jacobsen et al. | |
| 8,573,663 B1 * | 11/2013 | Lin | B25J 15/0009 |
| | | | 294/106 |
| 8,660,695 B2 | 2/2014 | De La Rosa Tames et al. | |
| 8,833,826 B2 * | 9/2014 | Garcia | B25J 15/0009 |
| | | | 294/111 |
| 9,844,886 B2 | 12/2017 | Beevers | |
| 2005/0107667 A1 * | 5/2005 | Danitz | A61B 1/0053 |
| | | | 600/139 |
| 2010/0280662 A1 | 11/2010 | Abdallah et al. | |
| 2011/0071664 A1 * | 3/2011 | Linn | B25J 9/0006 |
| | | | 700/213 |

\* cited by examiner

TENDON SYSTEMS FOR ROBOTS

RELATED APPLICATIONS

This application is a continuation of application U.S. Ser. No. 14/734,390, filed on Jun. 9, 2015, which is incorporated by reference as if fully set forth herein.

BACKGROUND

Robotics is gradually shifting from the design of robots that move very quickly through a carefully defined set of motions to robots that have a higher intelligence and a greater range of operation. As robotics advances, various barriers to further progress may emerge. Among the problems encountered in robot design is the use of complex mechanisms to transfer force from a motor to an arm or finger that needs to be moved. These complex mechanisms may include discrete fasteners and multiple hinge components, that are challenging to align and secure. This adds to the expense and defect rate of the manufacturing process.

Also, the greater the mechanical complexity, the greater the tendency for a mechanism to break down and require repair. The task of repair is also made more difficult, as complexity is increased. A simpler system of interconnections for force transfer would ease the task of originating a robust robot design.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first, separate aspect, the present invention may take the form of a robot tendon system having a robot arm having an exterior surface, and further rigid elements, each of which is moveably attached to the robot arm or to another of the further rigid elements. Further, a tendon retaining element defines a set of closed channels, and has a major exterior surface that is attached to the major surface of the robot arm. Finally, tendons extend through the closed channels and are attached to the rigid elements.

In a second, separate aspect, the present invention may take the form of a method of assembling a portion of a robot, including, providing a robot arm having an exterior surface and providing a tendon retaining element, having a first half having a first major surface, defining open channels and a second half having a second major surface. Then, placing a tendon in each of the open channels of the first half and placing the second major surface on the first major surface, thereby creating a set of closed channels each having a tendon passing therethrough and creating a finished tendon retaining element. Finally, attaching the finished tendon retaining element about the exterior surface of the robot arm, so that the tendons extend along the length of the robot arm.

In a third separate aspect, the present invention may take the form of a tendon and rigid element assembly that includes a tendon subassembly, including a tendon having a longitudinal end having a mating portion. Also, a rigid element has a mating portion. Further, a first one of the mating portions includes a set of projections and a second one of the mating portions defines a set of indentations that are sized and shaped to accept and retain the projections and wherein the set of projections are secured in the set of indentations, thereby securing the tendon to the rigid element.

In a fourth separate aspect, the present invention may take the form of a tendon and rigid element assembly, comprising a tendon subassembly, including a tendon having a longitudinal end having a pair of wings, extending laterally from the longitudinal end of the tendon and a rigid element having a mating portion. The wings are secured about the rigid element to secure the tendon subassembly to the rigid element.

In addition to the exemplary aspects and embodiments described above, further aspects and embodiments will become apparent by reference to the drawings and by study of the following detailed descriptions.

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

Figure 1:
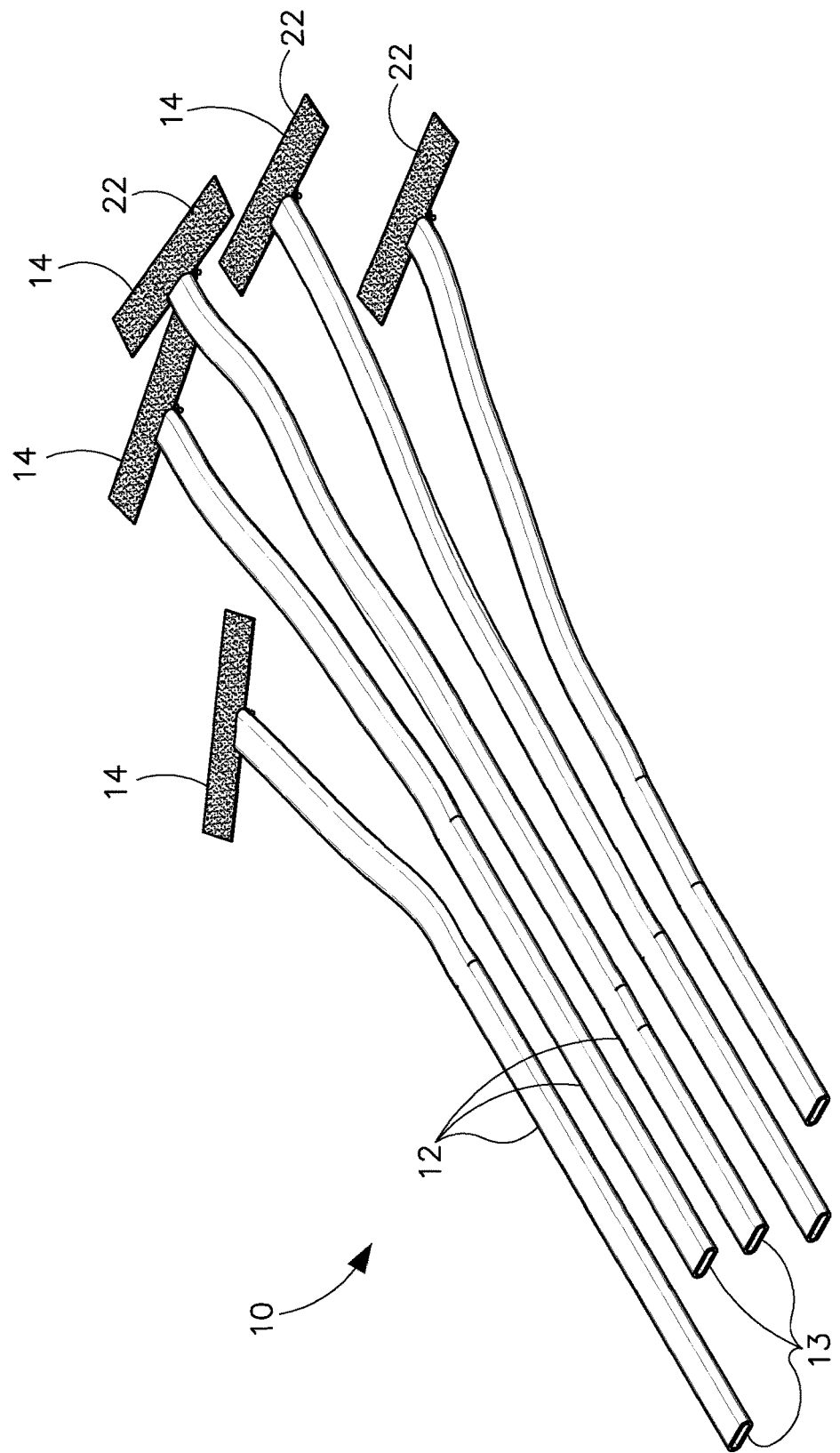
FIG. 1 is an isometric view of a first side of a set of robot tendon assemblies.
Figure 2:
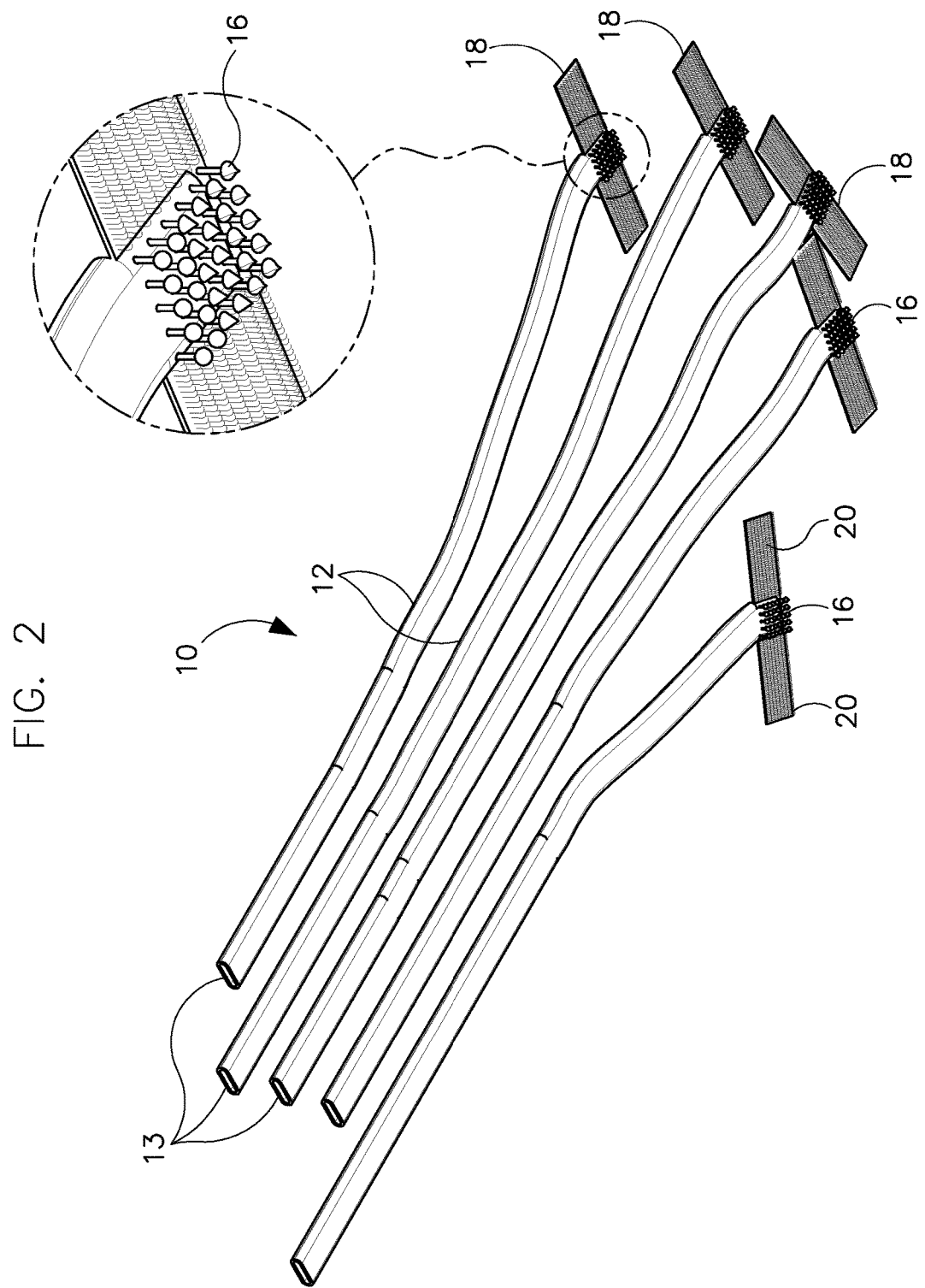
FIG. 2 is an isometric view of the set of robot tendon assemblies of FIG. 1, taken from a second side, that is opposed to the first side.

Referring to FIGS. 1 and 2, a set of tendons 10 are shown, in this case for manipulating the fingers of a robot hand. Each tendon 10 is made up of a tension transmitting portion 12, each defining a lumen 13, and an attachment portion 14. Referring to FIG. 2, each attachment portion 14 is, on a first major surface, made up of a central field of deformable projections 16 and a pair of wings 18, covered with loop material 20. On a second major surface, facing opposite from the first major surface, attachment portion 14 is covered with hook material 22. Accordingly, when an attachment portion 14 is wrapped about a post, hook material 22 mates with loop material 20. In an alternative preferred embodiment (not shown), wings that are generally similar in shape to wings 18 each have an adhesive surface for adhesively bonding said wings about a post.

Figure 3:
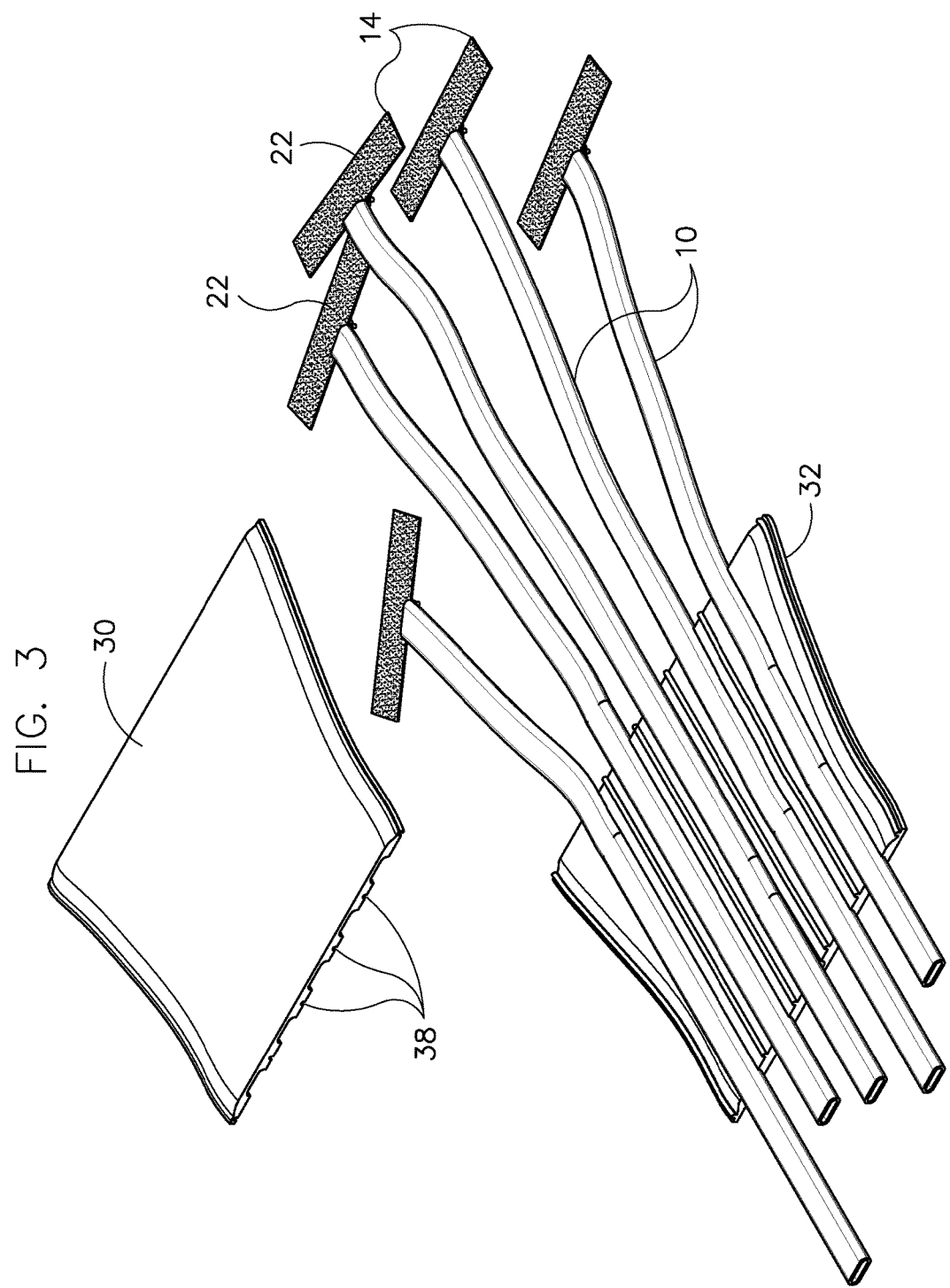
FIG. 3 is an isometric view of the set of robot tendon assemblies of FIG. 1, taken from the first side, and also showing two halves of a tendon sleeve, with the tendons being placed in a first half of the sleeve.
Figure 4:
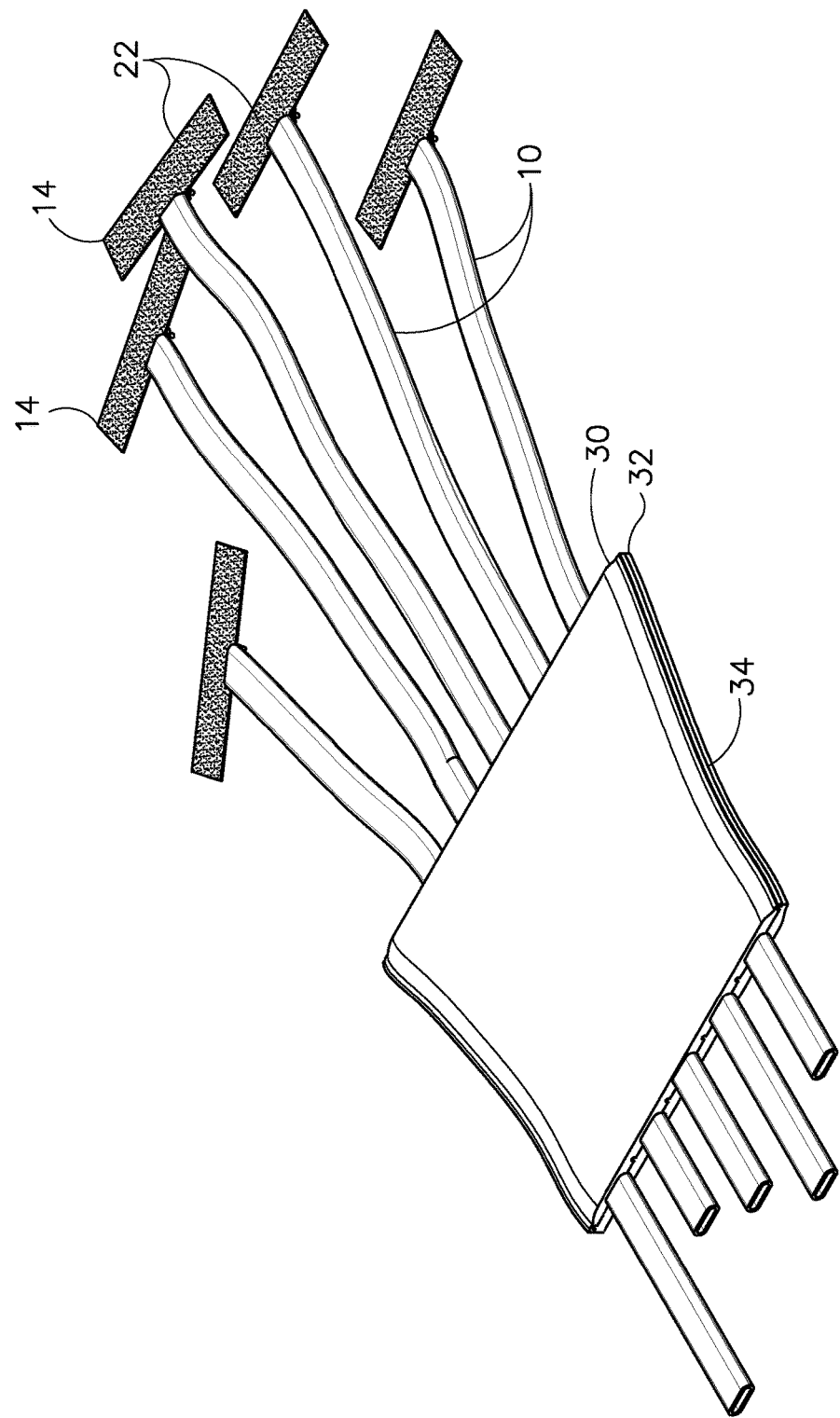
FIG. 4 is an isometric view of the tendon assemblies and sleeve halves of FIG. 3, with the sleeve halves being closed about the tendons, to form a complete sleeve.

Referring to FIGS. 3 and 4, an upper sleeve-half 30 and a lower sleeve-half 32 are joined together about tendons 10, to form a retaining sleeve 34 for tendons 10. The interior surfaces of sleeve 34 that contact tendons 10 are either made of a naturally lubricious material, such as poly tetrafluoroethylene or coated with a lubricant. Channels are formed by protruding linear elements 36, which interlock with narrow channels 38.

Figure 5:
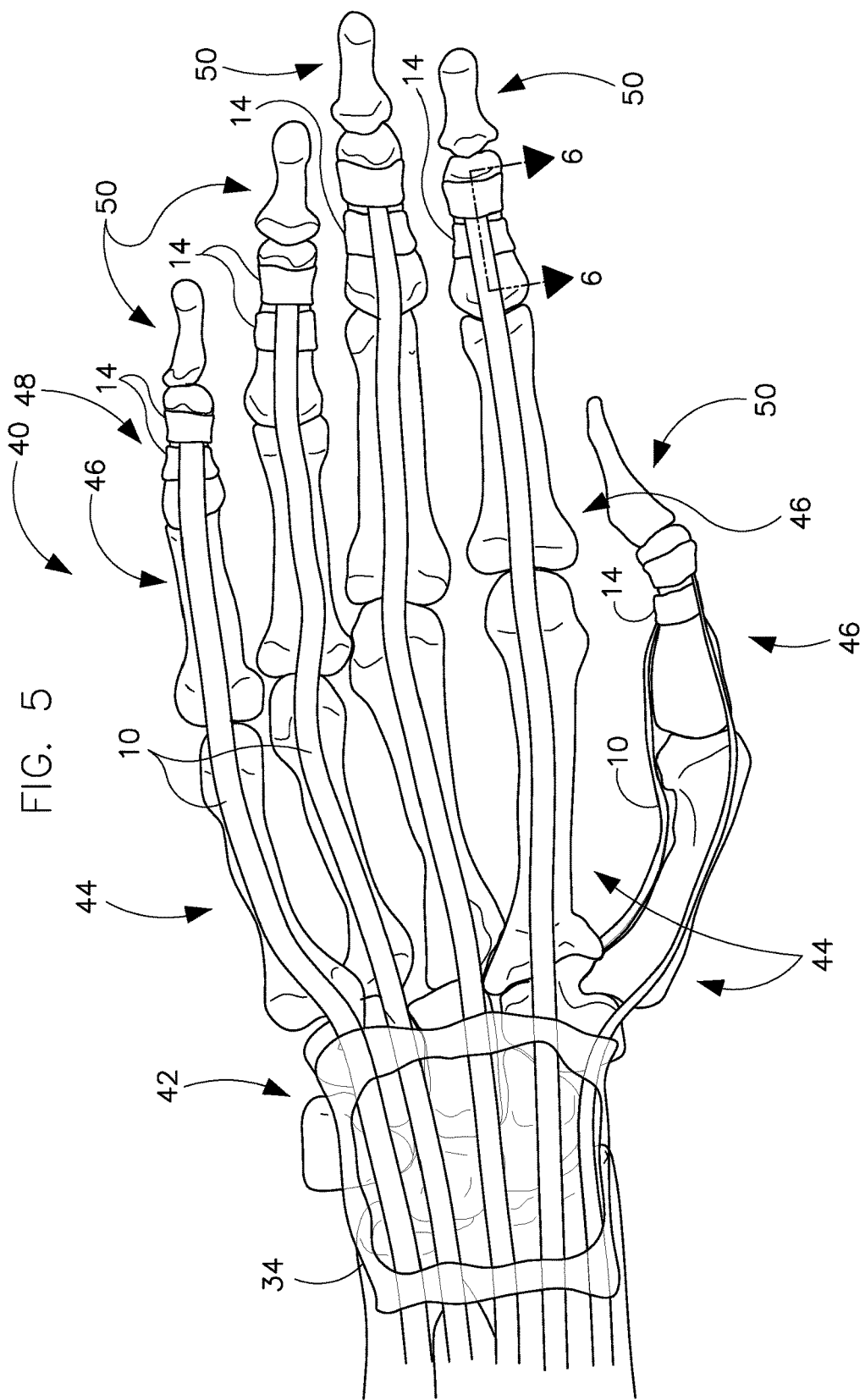
FIG. 5 is a top view of a robot hand showing the tendon assemblies and sleeve of FIG. 4, placed into their environments, and with the tendon assemblies attached to the rigid elements of the hand.

Referring to FIG. 5, a robotic hand assembly 40 is shown, in form mimicking a human hand having carpals 42, metacarpals 44, proximal phalanges 46, intermediate phalanges 48 and distal phalanges 50. The thumb does not have an intermediate phalange 48. In the embodiment shown, a first tendon 10 is attached to the back or dorsal side of each intermediate phalange 48, in part by wings 18. In the case of the thumb, a tendon 10 is attached to the proximal phalange. In like manner, a second tendon 10 is attached to the front or palmar side of each intermediate phalange 48, and on the proximal phalange 46 of the thumb. In FIG. 5, only the attachment portion 14 is visible of the second tendons that attach to the intermediate phalanges.

In an alternative preferred embodiment, the tendons 10 are each attached to a distal phalange 50. In an alternative embodiment, there is a separate tendon 10 attached to each phalange, 46, 48 and 50, or a single tendon attached to each phalange, 46, 48 and 50 that form into a single finger. In one preferred embodiment tendons 10 are moved by a tension force applicator (not shown), to pull the intermediate phalanges 48 inwardly. In this embodiment, tendons 10 are slidingly engaged with bones 42, 44 and 46, with guide elements keeping them in place. In another embodiment, intermediate 48 or distal phalange 50 is pulled by means of a tendon (not shown) that is threaded through lumen 13. In either one of these embodiments, lumens 13 may be used for conductive elements, carrying electrical signals.

Figure 6:
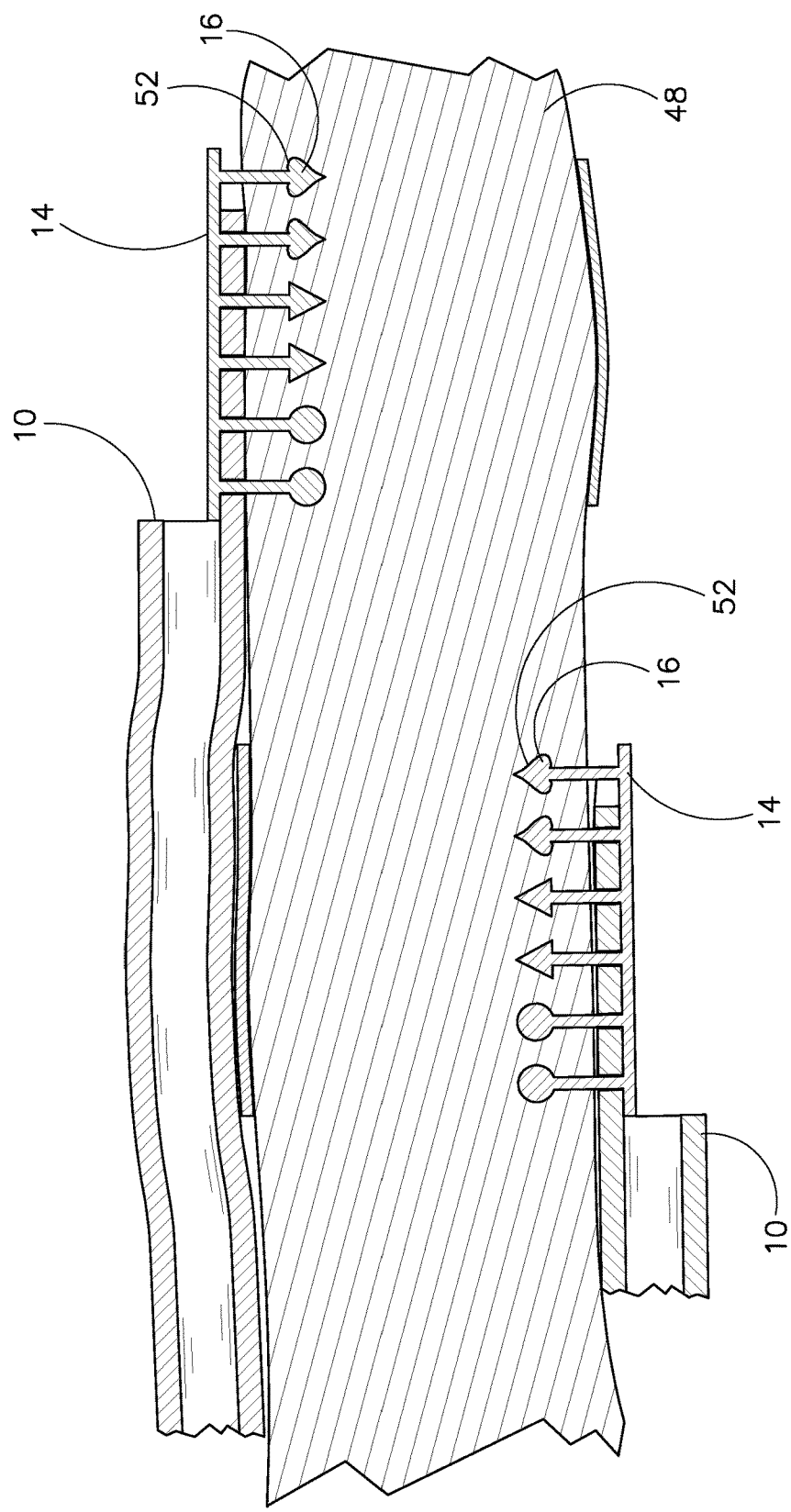
FIG. 6 is an expanded detail section view, taken along lines 6-6 of FIG. 5.

Referring to FIG. 6, which is a detail view of an attachment between tendon 10 and intermediate phalange 48, projections 16 fit into matching receptacles 52, to collectively form a strong bond between tendon 10 and phalange 48. Although in the embodiment shown the bones 42 mimic the shape of human finger bones, in alternative preferred embodiments they are simply a set of shafts, moveably attached together. More broadly, phalanges 46, 48 and 50 may be considered rigid elements. The scope of this invention is not limited to robot assemblies that have a similar appearance to the bone structure of a human hand, but extends to all jointed assemblies.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method of assembling a portion of a robot, comprising:
    (a) providing a robot arm having an exterior surface;
    (b) providing a tendon retaining element, having a first half having a first major surface, defining open channels and a second half having a second major surface;
    (c) placing a tendon in each of said open channels of said first half; and
    (d) placing said second major surface on said first major surface, thereby creating a set of closed channels each having a tendon passing therethrough and creating a finished tendon retaining element; and
    (e) attaching said finished tendon retaining element about said exterior surface of said robot arm, so that said tendons extend along the length of said robot arm.

2. The method of claim 1, wherein said first major surface is lubricious.

3. The method of claim 1, wherein said second major surface is lubricious.

4. The method of claim 1, wherein said first surface and said second surface define interlocking elements and wherein said act of placing said second major surface on said first major surface further includes locking together said interlocking elements, thereby joining said second major surface to said first major surface.

5. The method of claim 4, wherein said interlocking elements are linear and extend in the direction of said open channels at the exterior of said tendon retaining element, thereby sealing said tendon retaining element at its sides after said second surface is joined to said first surface.

6. The method of claim 4, wherein said interlocking elements are linear and extend along either side of each open channel, thereby sealing each channel along its sides, after said second surface is joined onto said first surface.

7. The method of claim 4, further including at least partially filling at least some of said open channels with lubricant prior to sealing each channel along its sides.

8. The method of claim 1, further wherein a set of fingers are each moveably attached to said robot arms and further including the step of attaching each tendon to a finger.

* * * * *